United States Patent
Jiang et al.

(10) Patent No.: US 10,048,162 B2
(45) Date of Patent: Aug. 14, 2018

(54) TESTING DEVICE AND TESTING METHOD FOR OPTICAL FILM

(71) Applicants: BOE Technology Group Co., Ltd., Beijing (CN); Hefei Xinsheng Optoelectronics Technology Co., Ltd., Anhui (CN)

(72) Inventors: Yiqiang Jiang, Beijing (CN); Qinglong Meng, Beijing (CN); Zhiyu Qian, Beijing (CN); Yanping Li, Beijing (CN); Linlin Wang, Beijing (CN); Jing Wan, Beijing (CN)

(73) Assignees: BOE Technology Group Co., Ltd., Beijing (CN); Hefei Xinsheng Optoelectronics Technology Co., Ltd., Hefei (CN)

( * ) Notice: Subject to any disclaimer, the term of this patent is extended or adjusted under 35 U.S.C. 154(b) by 223 days.

(21) Appl. No.: 15/154,433

(22) Filed: May 13, 2016

(65) Prior Publication Data
US 2016/0334654 A1 Nov. 17, 2016

(30) Foreign Application Priority Data
May 15, 2015 (CN) .......................... 2015 1 0251323

(51) Int. Cl.
*G01M 11/00* (2006.01)
*G01M 11/02* (2006.01)
*G01B 21/30* (2006.01)

(52) U.S. Cl.
CPC ............. *G01M 11/00* (2013.01); *G01B 21/30* (2013.01); *G01M 11/0214* (2013.01); *G01M 11/0278* (2013.01)

(58) Field of Classification Search
CPC ............. G01M 11/00; G01M 11/0214; G01M 11/0278
See application file for complete search history.

(56) References Cited

U.S. PATENT DOCUMENTS

| 5,136,886 | A | * | 8/1992 | Neigoff | ................ | G01N 17/004 |
| | | | | | | 356/246 |
| 7,038,196 | B2 | * | 5/2006 | Scott | .................... | G01N 17/002 |
| | | | | | | 250/252.1 |

FOREIGN PATENT DOCUMENTS

| CN | 1725047 A | | 1/2006 |
| CN | 1974290 A | | 6/2007 |
| CN | 102981290 A | * | 3/2013 |
| JP | 2006071633 A | | 3/2006 |

OTHER PUBLICATIONS

May 2, 2017—(CN) First Office Action Appn 201510251323.2 with English Tran.
Aug. 28, 2017—(CN) Second Office Action 201510251323.2 with English Tran.

* cited by examiner

*Primary Examiner* — Paul West
(74) *Attorney, Agent, or Firm* — Banner & Witcoff, Ltd.

(57) ABSTRACT

A testing device and a testing method for an optical film are disclosed. The testing device includes a carrier having a cavity, wherein the cavity is an enclosed space; a test condition providing module disposed in the enclosed space; wherein the optical film is disposed in the enclosed space and the test condition providing module is configured for providing a test condition simulating a real environment in a liquid crystal display module for the optical film. The testing device for an optical film is configured for testing the optical film to be tested.

17 Claims, 5 Drawing Sheets

TESTING DEVICE AND TESTING METHOD FOR OPTICAL FILM

This application claims priority to and the benefit of Chinese Patent Application No. 201510251323.2 filed on May 15, 2015, which application is incorporated herein in its entirety.

FIELD OF THE ART

Embodiments of the disclosure relate to the technical field of display technologies, more particularly, to a testing device and a testing method for an optical film.

BACKGROUND

With the continuous development of display technologies, liquid crystal displays (LCDs) are more and more widely used. As a LCD panel is passive light emitting device, a back light source is required to provide a light source for the LCD panel. In order to realize a better display effect, the back light source needs to use various optical films such as a light guide plate, a reflector, a diffuser plate, a prism sheet and the like.

Generally, in order to improve the display effect, it is needed to test mechanical properties (such as flatness and warpage, etc.) of optical films fabricated by different venders to evaluate and select optical films having better mechanical properties. Taking a prism sheet as an example, a conventional test needs to assemble the prism sheet module in a LCD module (including a LCD panel and a back light source) and allows the prism sheet to work in the liquid crystal display module for a period of time before taking the prism sheet out to observe whether the mechanical properties of the prism sheet are compromised.

SUMMARY

A first aspect of the disclosure provides a testing device for an optical film. The testing device comprises: a carrier having a cavity, wherein the cavity is an enclosed space; a test condition providing module disposed in the enclosed space; wherein the optical film is disposed in the enclosed space and the test condition providing module is configured for providing a test condition simulating a real environment in a liquid crystal display module for the optical film.

A second aspect of the disclosure provides a testing method for an optical film comprising placing the optical film in the testing device.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure. Based on the described drawings herein, those skilled in the art can obtain other drawing(s) without any inventive work.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
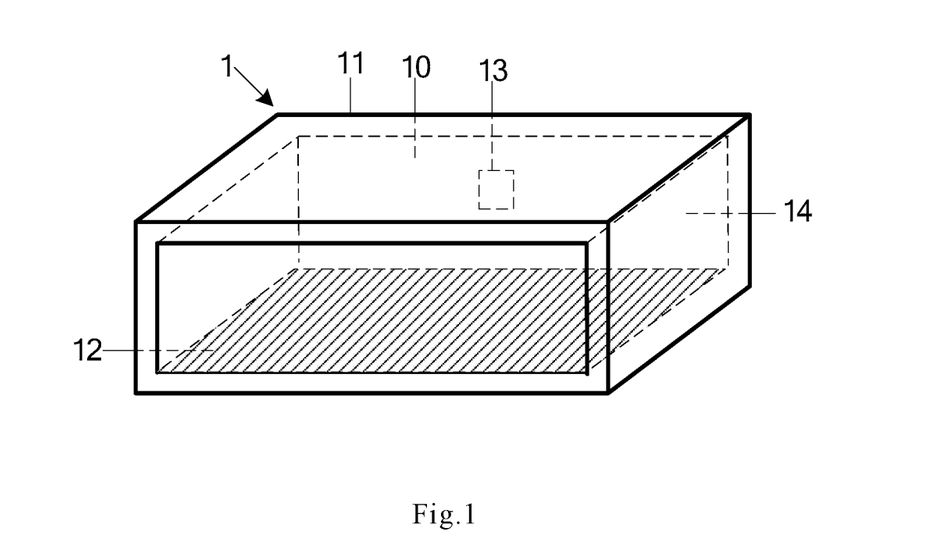
FIG. 1 schematically illustrates a testing device for an optical film in accordance with an embodiment of the disclosure.

As illustrated in FIG. 1, an embodiment of the disclosure provides a testing device 1 for an optical film. The testing device 1 comprises a carrier 11 having a cavity 10, and the cavity 10 is an enclosed space 14 having a shape of for example a cubic. A test condition providing module 13 is disposed in the enclosed space 14. An optical film to be tested is also placed in the enclosed space 14. The test condition providing module 13 is configured for providing a test condition for simulating a real environment in a liquid crystal display module for the optical film to be tested. As an example, the testing device 1 further comprises a test partition 12 disposed in the cavity 10, and the test partition 12 is configured for supporting the optical film to be tested. An enclosed space 14 is formed by the test partition 12, side walls of the cavity 10 and a top of the carrier 11. In the embodiment of the disclosure, the carrier 11 is an enclosed cuboid, that is, rectangle parallelepiped. However, the carrier 11 may have other enclosed shapes such as a cylinder, a sphere, a cube and the like in other embodiments of the disclosure. The carrier in the embodiment of the disclosure comprises a top, a bottom and four sides.

The test condition providing module 13 is disposed for example in the enclosed space 14 and on the side walls of the cavity. The side wall is a wall extending along a perimeter of the cavity, i.e., a side of the carrier.

In the embodiment of the disclosure, for the convenience of description, the enclosed space formed by the test partition, the side walls of the cavity and the top of the carrier as well as the test condition providing module disposed in the enclosed space may be referred to as a testing layer.

It is noted that, the testing device for an optical film provided by the embodiment of the disclosure can test various properties of the optical film such as physical properties and electrical properties. In at least some embodiments of the disclosure, mechanical properties of the optical film are tested. As an example, the testing device for an optical film provided by the embodiment of the disclosure can test mechanical properties of the optical film such as flatness, warpage, waviness and the like.

The testing device for an optical film provided by the embodiment of the disclosure can provide a test condition simulating a real environment in a liquid crystal display module for the optical film to be tested through the test condition providing module. That is, the testing device for an optical film provided by the embodiment of the disclosure can provide a test condition of an experiment environment simulating the real environment in a liquid crystal display module for the optical film to be tested, thus it is no longer necessary to assemble the optical film to be tested in a liquid crystal display module to test the optical film, thereby simplifying a testing process for an optical film and increasing a testing efficiency for an optical film In at least some embodiments of the disclosure, with reference to both FIG. 2 and FIG. 3, there is a plurality of test partitions 12 and a plurality of test condition providing modules 13. An enclosed space 14 is formed between each of test partitions 12 and the side walls of the cavity 10, thus, a plurality of enclosed spaces 14 is formed in the carrier 11. A test condition providing module 13 is disposed in each of the enclosed spaces 14.

Figure 2:
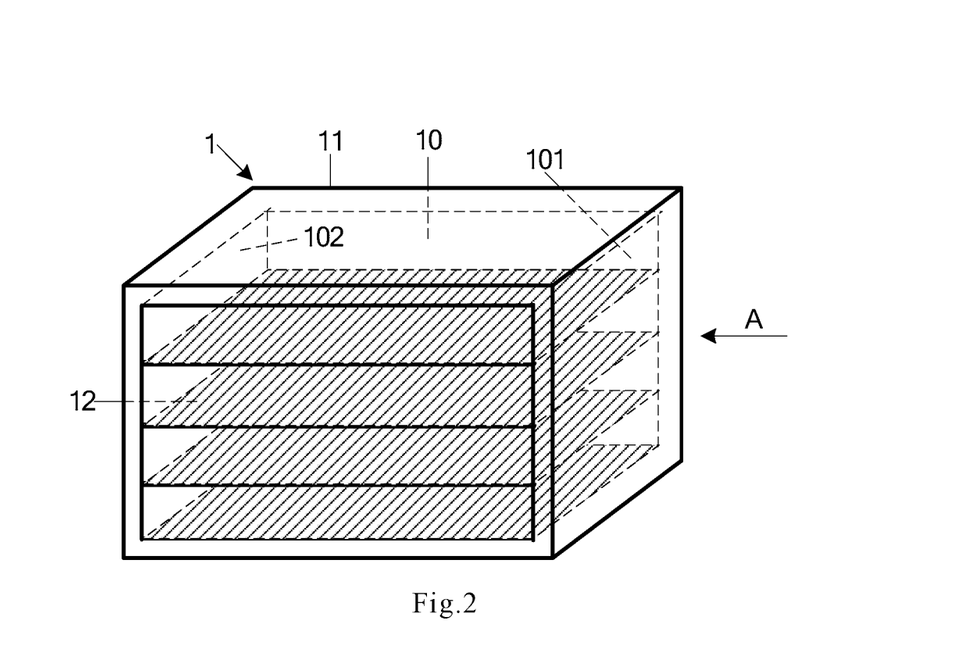
FIG. 2 schematically illustrates a testing device for an optical film in accordance with another embodiment of the disclosure.
Figure 3:
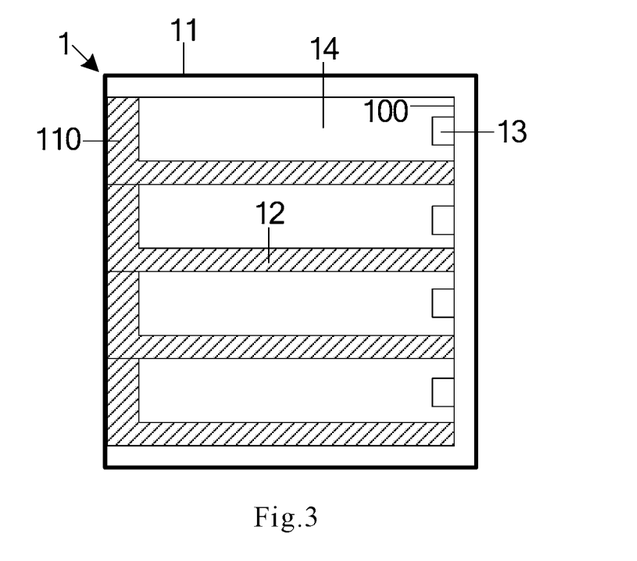
FIG. 3 schematically illustrates a cross section along direction A of the testing device for an optical film in FIG. 2.

As illustrated in FIG. 2, there is a plurality of testing layers disposed in the cavity 10 of the testing device 1 for an optical film provided by the embodiment of the disclosure, and each of the testing layer comprises one test partition 12, an enclosed space 14 formed between the test partition 12 and side walls of the cavity 10, and a test condition providing module 13 disposed in the enclosed space 14 as illustrated in FIG. 3.

Exemplarily, as illustrated in FIG. 3, the test condition providing module 13 is disposed in the enclosed space 14 and located on one of the side walls 100 of the cavity.

In the testing device for an optical film provided by the embodiment of the disclosure, one or more testing layers may be provided, which is not limitative to the embodiment of the disclosure.

When the testing device for an optical film provided by the embodiment of the disclosure has a plurality of testing layers, it is possible to test a plurality of optical films to be tested simultaneously by using the testing device for an optical film. That is, it is possible to place and test one optical film on each of the testing layer. As an example, if a same type of optical film such as prism sheet provided by different vendors is to be tested, it is possible to place and test the prism sheets provided by different vendors on respective testing layers. As an example, it is possible to place and test the prism sheets on the test partition of each of the testing layer and control the test condition providing module on each of the testing layer during the testing process, thus allowing the test condition providing module to provide a same test condition for the prism sheet tested on each of the testing layer, thereby guaranteeing a homogeneity of the test conditions for the prism sheets, further increasing the accuracy of testing results of the prism sheets.

Furthermore, when the mechanical property of optical films provided by different vendors are to be evaluated, the testing device for an optical film provided by the embodiment of the disclosure can test a plurality of optical films to be tested simultaneously and can further provide a same test condition for the optical films to be tested, thus guaranteeing a homogeneity of the experimental environment of the optical films to be tested, thereby increasing the accuracy of the evaluating results of the mechanical property of the optical films.

It is noted that, after the testing device for an optical film provided by the embodiment of the disclosure tests the optical film to be tested through providing an experimental environment simulating a real environment in a liquid crystal display module for the optical film to be tested, for example, a testing instrument is used to measure and evaluate the mechanical property of the optical film to be tested. As an example, if a flatness test for the optical film to be tested under a certain test condition is required, after providing the test condition for the optical film to be tested by using the testing device for an optical film provided by the embodiment of the disclosure and testing the optical film to be tested under the test condition, then a flatness testing instrument serves to measure and evaluate the flatness of the optical film to be tested.

For the testing device for an optical film provided by the embodiment of the disclosure, if there is one optical film to be tested, it is possible to place the optical film to be tested in the testing device for an optical film and test it directly in the embodiment of the disclosure instead of assembling the optical film to be tested in the liquid crystal display module and testing it, thereby simplifying the testing process of the optical film and increasing the testing efficiency of the optical film. If there is a plurality of the optical films to be tested, in addition to the benefit of simplifying the testing process of the optical films and increasing the testing efficiency of the optical films, the testing device for an optical film provided by the embodiment of the disclosure can provide a same experimental environment for the plurality of optical films to be tested, thereby increasing the accuracy of the testing result.

Figure 4:
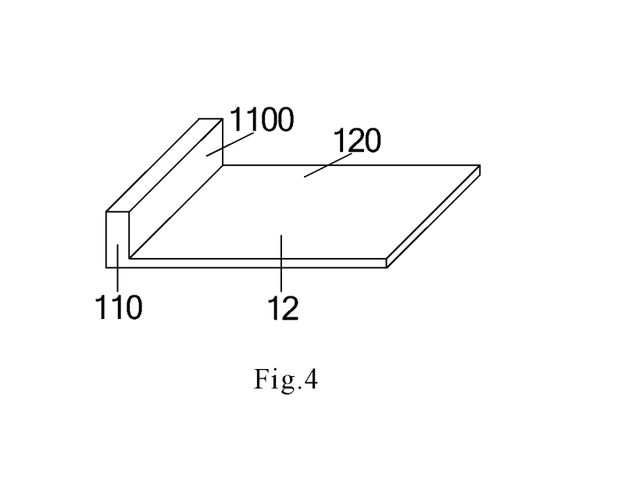
FIG. 4 schematically illustrates a partial diagram of a testing device for an optical film in accordance with an embodiment of the disclosure.
Figure 5:
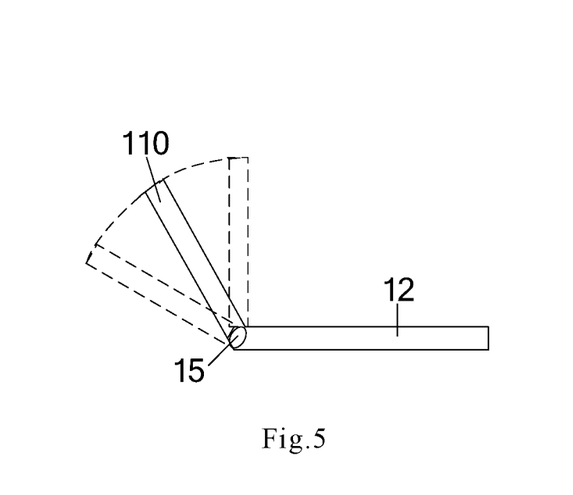
FIG. 5 schematically illustrates a partial diagram of a testing device for an optical film in accordance with another embodiment of the disclosure.

In at least some embodiments of the disclosure, with reference to FIG. 3, FIG. 4 and FIG. 5, one of the sides of the carrier 11 consists of a plurality of baffles 110, the plurality of baffles 110 is hinged to the plurality of test partitions 12 with a one to one correspondence, and the plurality of test partitions 12 is fixed onto two side walls of the cavity 10 which are opposite to each other. As an example, when a shape of the carrier 11 is a cylinder, a part of the annular side of the cylinder may consist of a plurality of baffles.

Other than the upper most test layer, the enclosed space 14 in any of other test layer is formed by two opposite test partitions 12, the baffle 110 and three side walls of the cavity 10 (as illustrated in FIG. 3). Herein the three side walls of the cavity 10 comprise a side wall 101, a side wall 102 (as illustrated in FIG. 2), and a side wall 100 (as illustrated in FIG. 3). The side walls 101 and 102 are orthogonal to a plane 120 having the test partition 12, and are orthogonal to a plane 1100 (as illustrated in FIG. 4) having the baffle 110, and are disposed on two opposite sides of the test partition 12, respectively. The side wall 100 (as illustrated in FIG. 3) which is orthogonal to the plane 120 having the test partition 12 and is parallel with the plane 1100 having the baffle 110.

The two side walls of the cavity 10 which are opposite to each other are respectively the side walls 101 and 102 which are disposed on both sides of the test partition 12 as illustrated in FIG. 2.

In the embodiment of the disclosure, the test partition 12 may be fixed onto any of the two side walls of the cavity 10 which are opposite to each other by using bolts, rivets, welding or other methods. In this case, as illustrated in FIG. 5, the baffle 110 is hinged to the test partition 12. As an example, the hinged connection is realized through a pin roll 15 or a hinge 15. The optical film to be tested is placed on the test partition 12 through opening the baffle 110.

The materials of the test partition 12 and the baffle 110 are not defined in the embodiment of the disclosure and can be selected according to actual requirements. As an example, the material of the test partition 12 is resin, acrylic, or wood, etc, and the material of the baffle 110 is resin, acrylic, or wood, etc. Particularly, the materials of the test partition 12 and the baffle 110 may be a same material or different materials, which is not limitative to the embodiment of the disclosure.

When only one testing layer is disposed in the testing device for an optical film, the enclosed space of the testing layer is made up of the test partition, the baffle, the side walls of the cavity (may comprise the three side walls 100, 101 and 102 of the cavity 10 as illustrated in FIG. 2 and FIG. 3) and a top (i.e., the top of the carrier 11) which is parallel to the plane having the test partition and above the test partition 12 together. When a plurality of testing layers are disposed in the testing device for an optical film, the enclosed space of the uppermost testing layer is made up of the test partition, the baffle, the side walls of the cavity and the top (i.e., the top of the carrier 11) which is parallel to the plane having the test partition and above the test partition 12, and the enclosed space of each of other testing layers is made up of the test partition, the baffle, the side walls of the cavity and another test partition which is above the test partition.

In at least some embodiments of the disclosure, when only one testing layer is disposed in the testing device for an optical film, the test partition in the testing layer serves as the bottom of the carrier (the surface opposite to the top of the carrier), and the enclosed space is made up of the top of the carrier, the bottom of the carrier, the baffle and three side walls of the cavity (may comprise the three side walls 100, 101 and 102 of the cavity 10 as illustrated in FIG. 2 and FIG. 3).

It is noted that, the above embodiment is exemplarily described by taking a specific configuration of one of a plurality of testing layers in a testing device for an optical film as an example. Specific configurations of other testing layers in the testing device for an optical film are the same with the specific configuration of the testing layer in the testing device for an optical film of the embodiment, and will not be elaborated herein.

Figure 6:
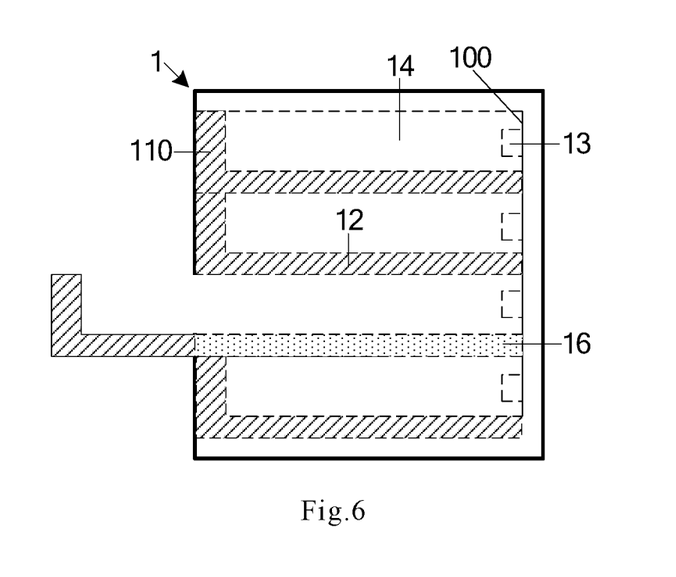
FIG. 6 schematically illustrates a cross section of a testing device for an optical film in accordance with another embodiment of the disclosure.

In at least some embodiments of the disclosure, with reference to FIG. 3, FIG. 4 and FIG. 6, one of the sides of the carrier 11 consists of a plurality of baffles 110, the plurality of baffles is fixed to the plurality of test partitions 12 with a one to one correspondence, and the test partitions 12 are connected to the two side walls of the cavity 10 which are opposite to each other by a slide rail 16 respectively.

The two side walls of the cavity 10 which are opposite to each other are the side wall 101 and the side wall 102 which are disposed on both sides of the test partition 12 as illustrated in FIG. 2 respectively.

In the embodiment of the disclosure, the baffle 110 and the test partition 12 may be fabricated through an integrally formed structure. The baffle 110 may be fixed to the test partition 12 by using a bolts, rivets, welding or other methods. In this case, as illustrated in FIG. 6, the test partition 12 is connected to the two side walls of the cavity 10 which are opposite to each other by a slide rail 16 respectively. Due to the above configuration, it is possible to pull out the baffle 110 and the test partition 12 as a whole and place the optical film to be tested on the test partition 12.

Figure 7:
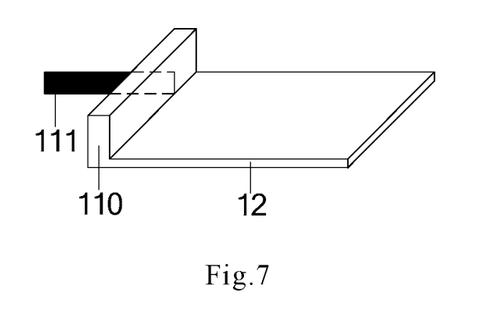
FIG. 7 schematically illustrates a partial diagram of a testing device for an optical film in accordance with still another embodiment of the disclosure.

In at least some embodiments of the disclosure, the baffle 110 has a handle 111 disposed thereon as illustrated in FIG. 7.

When the baffle 110 and the test partition 12 in the FIG. 7 are hinged to each other as illustrated in FIG. 5, it is possible to pull the handle 111 to open the baffle 110 so as to place the optical film to be tested on the test partition 12 conveniently.

When the baffle 110 and the test partition 12 in the FIG. 7 are fixed to each other and the test partition 12 is connected to the two side walls of the cavity 10 by a slide rail 16 respectively as illustrated in FIG. 6, it is possible to pull the test partition 12 through the handle 111, so that the test partition 12 is pulled out after sliding out along the slide rail 16 (details are as illustrated in FIG. 6), thereby placing the optical film to be tested on the test partition 12 conveniently.

A material of the handle 111 is not defined in the embodiment of the disclosure and can be selected according to the actual requirements. As an example, the material of the handle 111 is resin, acrylic, or wood, etc. More particularly, materials of the handle 111, the test partition 12 and the baffle 110 may be a same material or different materials, and it is not defined in the embodiment of the disclosure.

Figure 8:
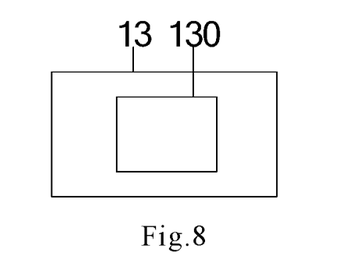
FIG. 8 schematically illustrates a diagram of a test condition providing module in accordance with an embodiment of the disclosure.

In at least some embodiments of the disclosure, as illustrated in FIG. 8, the test condition providing module 13 comprises a heating module 130, and the heating module 130 is configured for providing a temperature environment simulating a real temperature environment in a liquid crystal display module for the optical film. The temperature environment provided by the heating module 130 can be configured for a high temperature test for the optical film to be tested.

In at least some embodiments of the disclosure, with reference to FIG. 3 and FIG. 8, the heating module 130 is fixed onto any of side walls of the cavity 10. As an example, the heating module 130 is fixed onto the side wall 100 of the cavity 10 which is opposite to the baffle 110 and orthogonal to the test partition 12 as illustrated in FIG. 3, or fixed onto the side wall 101 or 102 which is disposed on one of two sides of the test partition 12 as illustrated in FIG. 2, and it is not limited in the embodiment of the disclosure.

When the heating module is fixed onto the side wall 100, the heating module 130 can simulate a back light source of a liquid crystal display module accurately, thereby providing an environment simulating a real environment in a liquid crystal display module for the optical film to be tested.

The heating module 130 in the embodiment of the disclosure can provide a temperature environment simulating a real temperature environment in a liquid crystal display module for the optical film to be tested by simulating a back light source in a liquid crystal display module, thus allowing the optical film to be tested to be in a temperature environment similar to a real temperature environment in a liquid crystal display module, thereby guaranteeing the accuracy of the temperature test for the optical film to be tested.

Figure 9:
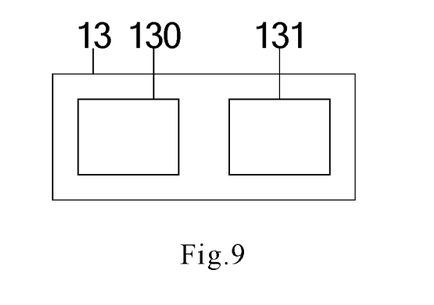
FIG. 9 schematically illustrates a diagram of a test condition providing module in accordance with another embodiment of the disclosure.

In at least some embodiments of the disclosure, as illustrated in FIG. 9, the test condition providing module 13 further comprises a humidifying module 131, and the humidifying module 131 is configured for providing a humidity environment simulating a real humidity environment in a liquid crystal display module for the optical film to be tested. The humidity environment provided by the humidifying module 131 can be used on humidity test for the optical film to be tested. According to an environment to be simulated, the heating module 130 and the humidifying module 131 can work alone separately.

In at least some embodiments of the disclosure, the humidifying module 131 may be fixed onto a same side wall which the heating module 131 is disposed thereon, or may be fixed onto a different side wall from the side wall which the heating module 131 is disposed thereon. The positions which the heating module and the humidifying module are disposed thereon can be configured according to the actual requirements, and it is not limited in the embodiment of the disclosure.

The humidifying module 131 of the embodiment of the disclosure can provide a humidity environment simulating a real humidity environment in a liquid crystal display module for the optical film to be tested through simulating the liquid crystal display, thus allowing the optical film to be tested to be in a humidity environment similar to a real humidity environment in a liquid crystal display module, thereby guaranteeing the accuracy of the temperature test for the optical film to be tested.

Figure 10:
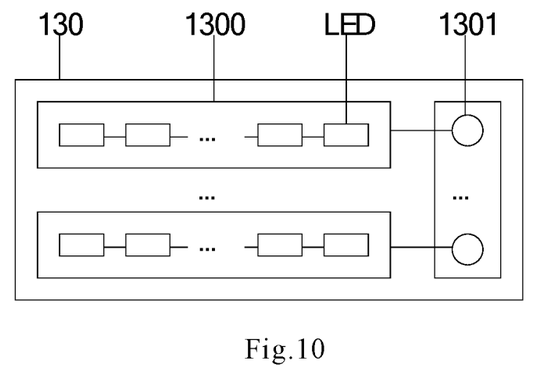
FIG. 10 schematically illustrates a diagram of a heating module in accordance with an embodiment of the disclosure.

In at least some embodiments of the disclosure, as illustrated in FIG. 10, the heating module 130 provided by the embodiment of the disclosure comprises at least two heat source components 1300 and at least two first switches 1301 respectively configured for controlling the at least two heat source components 1300 with a one to one correspondence.

In the heating module 130 provided by the embodiment of the disclosure, it is possible to turn on or turn off the heat source components 1300 through the first switches 1301, thereby realizing the control of temperature provided for the optical film to be tested.

In at least some embodiments of the disclosure, as illustrated in FIG. 10, each of the heat source components 1300 comprises a plurality of light emitting diodes (LEDs) which are connected in series, and the first switch 1301 is configured for controlling the plurality of LEDs.

The heat source components 1300 provided by the embodiment of the disclosure is realized by a plurality of LEDs which are connected in series and can simulate a more real back light source in a liquid crystal display module, thereby increasing the accuracy of test for the optical film to be tested.

Figure 11:
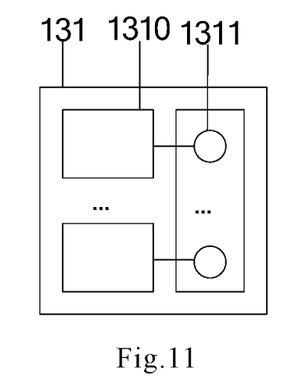
FIG. 11 schematically illustrates a diagram of a humidifying module in accordance with an embodiment of the disclosure.

In at least some embodiments of the disclosure, as illustrated in FIG. 11, the humidifying module 131 comprises at least two humidity source components 1310 and at least two second switches 1311 respectively configured for controlling the at least two humidity source components 1310 with a one to one correspondence.

In the humidifying module 131 provided by the embodiment of the disclosure, it is possible to turn on or turn off the humidity source components 1310 through the second switches 1311, thereby realizing the control of humidity provided for the optical film to be tested.

In at least some embodiments of the disclosure, as illustrated in FIG. 11, the humidity source components 1310 are humidifiers, and the second switches 1311 are configured for controlling the humidifiers.

The humidity source components provided by the embodiment of the disclosure may be components which have humidifying function such as spraying pots besides humidifiers, and it is not limited in the embodiment of the disclosure.

It is noted that, FIG. 10 and FIG. 11 schematically illustrate a heating module 130 and a humidifying module 131 respectively. A schematic drawing that the heating module 130 and the humidifying module 131 are included by the test condition providing module 13 can be obtained by combining the FIG. 10 and FIG. 11 on the base of FIG. 9, and it will not be elaborated herein.

In at least some embodiments of the disclosure, a shape of the cavity may be a cuboid, or may be a cube, or may be a cylinder, sphere, etc. It is not limited in the disclosure. Correspondingly, a shape of the test partition 12 need to be corresponding to that of the cavity 10, so that an enclosed space is formed in each of the testing layers is, thus preventing the plurality of testing layers from being compromised by each other (particularly the compromise to each other from the test condition providing module 13 of each of the testing layers), thereby increasing the accuracy of the test for the optical film.

In order to adapt to the shape of a back light source, a shape of the optical film to be tested is generally a cuboid. Due to the above configuration, as illustrated in FIG. 1, the shape of the cavity is a cuboid, and the shape of the test partition 12 is also a cuboid. In this case, it is possible to allow the shapes of the cavity 10 and the test partition 12 to match the shape of the optical film to be tested.

Furthermore, sizes of the cavity 10 and the test partition 12 can be designed adaptively according to a size of the optical film to be tested.

In at least some embodiments of the disclosure, in the testing device for an optical film provided by the embodiment of the disclosure, a material of the carrier 11 is resin, acrylic, or wood, etc. The specific material can be selected according to actual requirements, and it is not limited in the embodiment of the disclosure.

The embodiment of the disclosure further provides a method for testing an optical film. The method comprises placing the optical film in the testing device of the above embodiments.

As an example, the testing device comprises a test partition and the method comprises placing the optical film on the test partition.

As an example, there is a plurality of the test partitions and a plurality of test condition providing modules, a plurality of enclosed spaces is formed between the plurality of test partitions and the carrier, the test condition providing module is disposed in each of the enclosed spaces, there is a plurality of optical films, and the method comprises placing each of the optical films in one of the plurality of enclosed spaces.

In the testing device for an optical film provided by the embodiment of the disclosure, the optical film to be tested is placed in an enclosed place and the test condition providing module can provide a test condition of simulating a real environment in a liquid crystal display module for the optical film to be tested. Due to the above fact, when the optical film to be tested is placed in the enclosed space to be tested, the testing device can simulate a real environment in a liquid crystal display module for the optical film, thus it is possible to test the optical film by placing the optical film in the testing device provided by the embodiment of the disclosure during the test for the optical film instead of assembling the optical film in a liquid crystal display module to test it, thereby simplifying the test process of the optical film and increasing the test efficiency of the optical film.

What is described above is related to the illustrative embodiments of the disclosure only and not limitative to the scope of the disclosure; the scopes of the disclosure are defined by the accompanying claims.

The present application claims priority from Chinese Application No. 201510251323.2, filed on May 15, 2015, the disclosure of which is incorporated herein by reference in its entirety.

What is claimed is:

1. A testing device for an optical film, comprising:
   a carrier having a cavity, wherein the cavity is an enclosed space;
   a test condition providing module disposed in the enclosed space; and
   a test partition disposed in the enclosed space,
   wherein the optical film is disposed in the enclosed space and the test condition providing module is configured for providing a test condition simulating a real environment in a liquid crystal display module for the optical film,
   wherein the test condition providing module comprises a heating module, and the heating module is configured for providing a temperature environment simulating a real temperature environment in the liquid crystal display module for the optical film, and
   wherein the heating module is fixed onto a side wall of the cavity which is orthogonal to the test partition.

2. The testing device of claim 1, wherein the test partition is configured for supporting the optical film.

3. The testing device of claim 1, wherein the test partition is plural and the test condition providing module is plural, a plurality of enclosed spaces are formed between the plurality of test partitions and the carrier, and the test condition providing module is disposed in each of the enclosed spaces.

4. The testing device of claim 3, wherein a side of the carrier consists of a plurality of baffles and the plurality of baffles are hinged to the plurality of test partitions with a one to one correspondence.

5. The testing device of claim 4, wherein each of the baffles is provided with a handle.

6. The testing device of claim 3, wherein the test partitions are fixedly connected to two side walls of the cavity which are opposite to each other.

7. The testing device of claim 3, wherein a side of the carrier consists of a plurality of baffles and the plurality of baffles are fixedly connected to the plurality of test partitions with a one to one correspondence.

8. The testing device of claim 7, wherein each of the test partitions is connected to two side walls of the cavity which are opposite to each other by a slide rail respectively.

9. The testing device of claim 1, wherein the heating module comprises at least two heat source components and at least two first switches respectively configured for controlling the at least two heat source components with a one to one correspondence.

10. The testing device of claim 9, wherein each of the heat source components comprise a plurality of light emitting diodes connected in series and wherein the first switches are configured for controlling the plurality of light emitting diodes.

11. The testing device of claim 1, wherein the test condition providing module further comprises a humidifying module and the humidifying module is configured for providing a humidity environment simulating a real humidity environment in the liquid crystal display module for the optical film.

12. The testing device of claim 11, wherein the humidifying module comprises at least two humidity source components and at least two second switches respectively configured for controlling the at least two humidity source components with a one to one correspondence.

13. The testing device of claim 12, wherein the humidity source components are humidifiers and wherein the second switches are configured for controlling the humidifiers.

14. The testing device of claim 1, wherein a shape of the cavity is cuboid.

15. A method for testing an optical film, comprising placing the optical film in the testing device of claim 1.

16. The method of claim 15, further comprises placing the optical film on the test partition.

17. The testing-method of claim 15, wherein the test partition is plural and the test condition providing module is plural, a plurality of enclosed spaces is formed between the plurality of test partitions and the carrier, the test condition providing module is disposed in each of the enclosed spaces, the optical film is plural, and each of the optical films is placed in an enclosed space.

* * * * *